(12) United States Patent
Hu

(10) Patent No.: US 8,325,106 B2
(45) Date of Patent: Dec. 4, 2012

(54) SEAMLESS DISPLAY APPARATUS HAVING A PLURALITY OF PANELS AND A LIGHT-PERVIOUS HOLLOW TUBE FOR TWICE REFRACTING AN EMITTED LIGHT

(75) Inventor: Chung-Ming Hu, Taipei (TW)

(73) Assignee: Oripix Company Limited, Taipei (TW)

( * ) Notice: Subject to any disclaimer, the term of this patent is extended or adjusted under 35 U.S.C. 154(b) by 527 days.

(21) Appl. No.: 12/548,633

(22) Filed: Aug. 27, 2009

(65) Prior Publication Data

US 2010/0053028 A1 Mar. 4, 2010

(30) Foreign Application Priority Data

Aug. 27, 2008 (TW) .............................. 97132683 A

(51) Int. Cl.
*G09G 5/00* (2006.01)

(52) U.S. Cl. ........................................................ 345/1.3

(58) Field of Classification Search .................... 345/1.3
See application file for complete search history.

(56) References Cited

U.S. PATENT DOCUMENTS

| | | | | |
|---|---|---|---|---|
| 6,128,054 A | * | 10/2000 | Schwarzenberger | 349/73 |
| 2003/0231144 A1 | * | 12/2003 | Cho et al. | 345/1.3 |
| 2004/0051944 A1 | * | 3/2004 | Stark | 359/448 |
| 2006/0077544 A1 | * | 4/2006 | Stark | 359/448 |
| 2006/0238440 A1 | * | 10/2006 | Kim et al. | 345/1.1 |
| 2008/0062715 A1 | * | 3/2008 | Park et al. | 362/612 |
| 2008/0259248 A1 | * | 10/2008 | Shimazaki et al. | 349/65 |
| 2009/0027917 A1 | * | 1/2009 | Chen et al. | 362/582 |
| 2009/0122229 A1 | * | 5/2009 | Kim et al. | 349/65 |

* cited by examiner

*Primary Examiner* — Chanh Nguyen
*Assistant Examiner* — Long D Pham
(74) *Attorney, Agent, or Firm* — WPAT, P.C.; Anthony King

(57) ABSTRACT

A seamless display apparatus having a plurality of panels connected side by side is disclosed. A backlight module disposed under the panels emits a light and perpendicularly transmits the light onto the panels. The region between two adjacent panels is invisible without any light passing therethrough. A light-pervious hollow tube is disposed above a joint section of the two adjacent panels and a protection glass is provided over the light-pervious hollow tube. In such a way, the invisible region is eliminated from the protection glass by twice refraction occurring at the outer and inner sides of the light-pervious hollow tube.

10 Claims, 3 Drawing Sheets

SEAMLESS DISPLAY APPARATUS HAVING A PLURALITY OF PANELS AND A LIGHT-PERVIOUS HOLLOW TUBE FOR TWICE REFRACTING AN EMITTED LIGHT

BACKGROUND OF THE INVENTION

1. Field of the Invention

The present invention relates generally to a seamless display apparatus having a plurality of panels, and more particularly, to a display apparatus having a plurality of panels, in which there is no invisible region between any two neighboring panels.

2. The Prior Arts

Electronic display boards are often used for public advertising purpose. Accordingly, large area LCD apparatuses are now highly demanded in the market. However, restricted by many factors, large area panels are usually manufactured with a high production cost and a low yield. As such, an alternative solution is proposed to obtain a large size panel by arranging a plurality of small size panels side by side.

Referring to FIG. 1, it illustrates a display structure of a conventional seamless display apparatus having a plurality of panels. The display structure includes a backlight module 7, a first LCD panel 51, a second LCD panel 53, a first concave lens 3, a second concave lens 5, and a protective glass 10. The protective glass 10 is positioned at a topmost side of the display structure, and the backlight module 7 is positioned at a bottommost side of the display structure. The first LCD panel 51 and the second LCD panel 53 are disposed over the backlight module 7. The first concave lens 3 is disposed positionally corresponding to and parallel with the first LCD panel 51, and the second concave lens 5 is positionally disposed corresponding to and parallel with the second LCD panel 53. With respect to the first LCD panel 51 and the second LCD panel 53, there is an invisible region 55. The first concave lens 3 is positioned over the backlight module 7 and under the protective glass 10. The protective glass 10 includes an image-presenting region S. The image-presenting region S is positioned corresponding to an invisible region 55.

The backlight module 7 provides an incident light. The incident light is transmitted through the first LCD panel 51 and reaches the first concave lens 3. According to the Snell's refraction law, the incident light provided to the first concave lens 3 is diverged thereby, and the light outputted from the first concave lens 3 then enters the image-presenting region S of the protective glass 10. Similarly, the incident light is transmitted through the second LCD panel 53 and reaches the second concave lens 5, and is diverged thereby, and the light outputted from the second concave lens 5 then enters the image-presenting region S of the protective glass 10.

Unfortunately, the concave lenses employed in the conventional display apparatus are very expansive and restricted for single size LCD panels. When larger LCD panels are used, the concave lens must be correspondingly larger. Further, the collimation accuracy between the concave lenses and corresponding LCD panels seriously affect the performance of the display apparatus. When strict criteria for assembly tolerance are applied, the production cost will be high, when less strict criteria are applied, the elimination of the invisible region may be adversely affected.

As such, a seamless display device which is cheaper, and has an eliminated invisible region is desired.

SUMMARY OF THE INVENTION

A primary objective of the present invention is to provide a method for fabricating a seamless display apparatus having a plurality of panels. The method includes: securing a light-pervious hollow tube under a protective glass, and collimating the light-pervious hollow tube with a joint section of two adjacent LCD panels positioned thereunder. Therefore, the incident light emitted from the backlight module under the LCD panels is twice refracted by an outer side surface and an inner side surface of the light-pervious hollow tube respectively, by which the invisible region is eliminated from the light-outputting surface of the protective glass.

Another objective of the present invention is to provide a method for fabricating a seamless display apparatus having a plurality of panels. The method includes: filling a certain material into a light-pervious hollow tube, securing the light-pervious hollow tube under a protective glass, and collimating the light-pervious hollow tube with a joint section of two adjacent LCD panels positioned thereunder. Therefore, the incident light emitted from the backlight module under the LCD panels is twice refracted by an outer side surface and an inner side surface of the light-pervious hollow tube respectively, by which the invisible region is eliminated from the light-outputting surface of the protective glass.

A further objective of the present invention is to provide a seamless display apparatus having a plurality of panels. The seamless display apparatus includes a light-pervious hollow tube. The outer cross-section of the light-pervious hollow tube for example is triangle shaped, trapezoid shaped, or other polygon shaped, and the inner cross-section of the light-pervious hollow tube for example is triangle shaped, trapezoid shaped, or other polygon shaped. The outer cross-section and the inner cross-section of the light-pervious hollow tube may be adaptively selected in accordance with the practical application.

A still further objective of the present invention is to provide a seamless display apparatus having a plurality of panels. The seamless display apparatus includes a light-pervious hollow tube. The light-pervious hollow tube is filled up with a certain material having a refractive index different from the refractive index of air. Facilitated with the specifically designed outer cross-section and inner cross-section of the light-pervious hollow tube, the light-pervious hollow tube is adapted for deflecting the incident light to perpendicularly enter the image-presenting region of the protective glass, thus achieving a visual seamless effect.

In summary, the present invention provides a seamless display apparatus having a plurality of panels and a method for fabricating the same for eliminating the invisible region from the panels. The present invention is adapted for saving production cost, and is convenient for assembly. The present invention if further adapted for producing display apparatuses of a variety of sizes, and is also adapted for mass production of large area display apparatuses. In such a way, the present invention can also be applied for customizing electronic boards.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
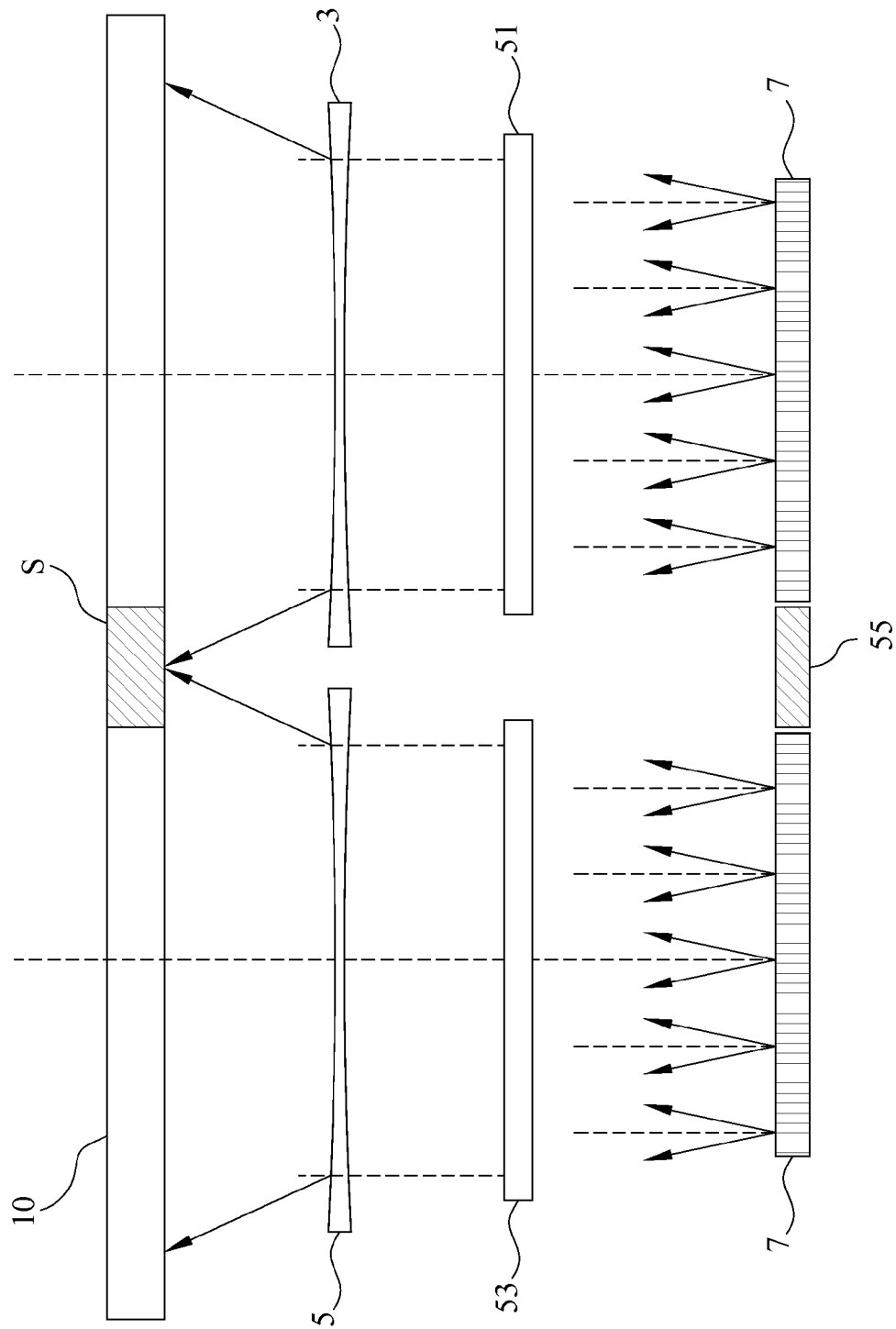
FIG. 1 is a schematic diagram illustrating the display structure of a conventional seamless display apparatus having a plurality of panels.
Figure 2:
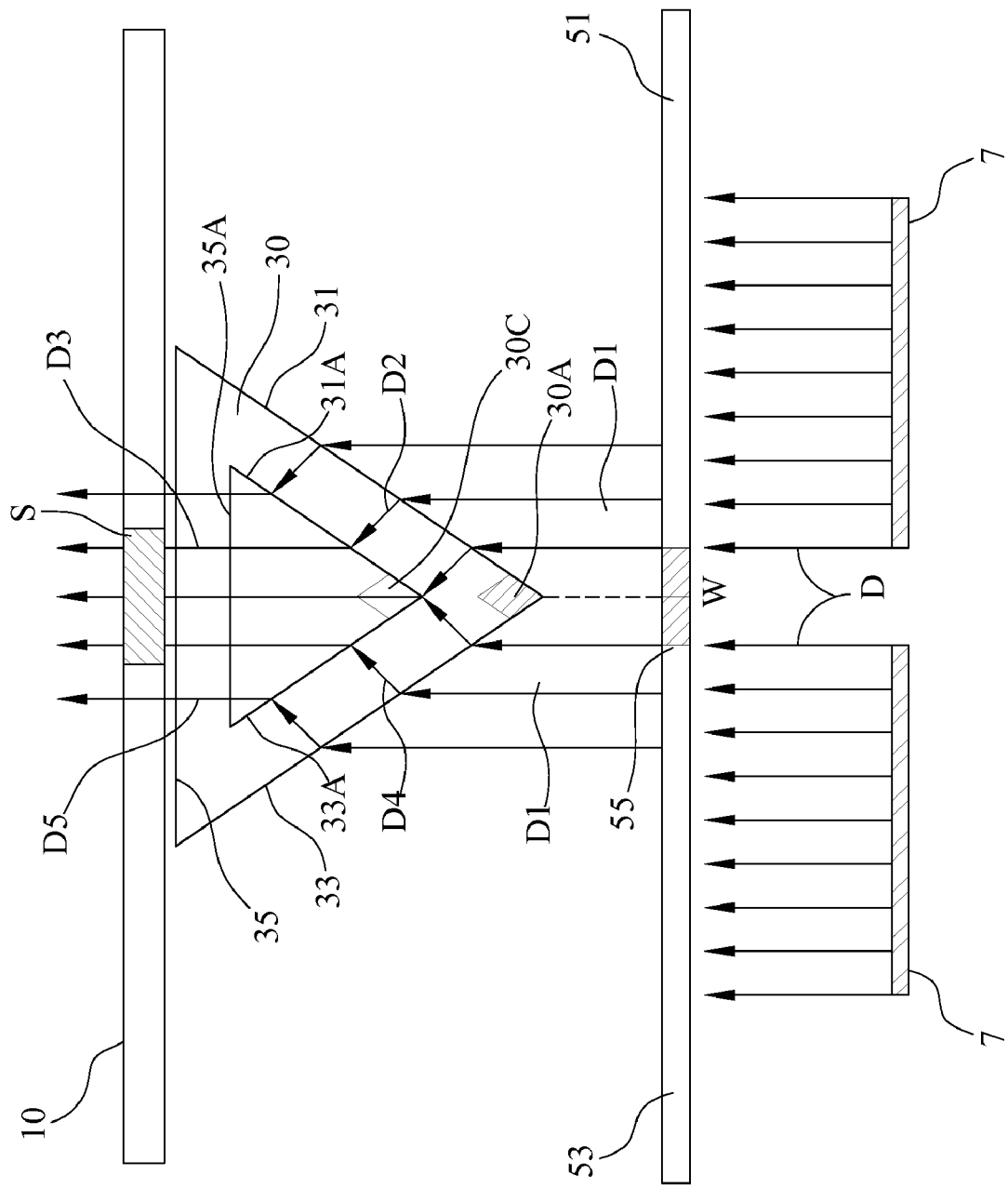
FIG. 2 illustrates the structure of a seamless display apparatus according to a first embodiment and a third embodiment of the present invention.

FIG. 2 illustrates the structure of the seamless display apparatus according to a first embodiment of the present invention. Referring to FIG. 2, there is shown a structure of the display apparatus. The structure includes a protective glass 10, a light-pervious hollow tube 30, a first LCD panel 51, a second LCD panel 53, and a backlight module 7. As shown in FIG. 2, the first LCD panel 51 and the second LCD panel 53 are positioned over the backlight module 7. There exists an invisible region 55 between the first LCD panel 51 and the second LCD panel 53. The invisible region 55 has a width W. The protective glass 10 includes an image-presenting region S corresponding to the invisible region 55. It should be noted that the first LCD panel 51 and the second LCD panel 53 are exemplified for illustration of the present invention, while other kinds of panels are applicable for substitution.

The light-pervious hollow tube 30 is disposed over the first LCD panel 51 and the second LCD panel 53. The light-pervious hollow tube 30 for example is made of glass or light-pervious plastic. The light-pervious hollow tube 30 is hollow inside which defines an inner vacant space inside the light-pervious hollow tube 30. The protective glass 10 is positioned over the light-pervious hollow tube 30. The light-pervious hollow tube 30 is longitudinally disposed along a joint section between the first LCD panel 51 and the second LCD panel 53 and has an outer cross-section, and an inner cross-section. The outer cross-section of the light-pervious hollow tube 30 for example is triangle shaped and has a first outer side 31, a second outer side 33, and a third outer side 35. The inner cross-section of the light-pervious hollow tube 30 for example is also triangle shaped and has a first inner side 31A, a second inner side 33A, and a third inner side 35A. Preferably, the first outer side 31 is parallel with the first inner side 31A, the second outer side 33 is parallel with the second inner side 33A, and the third outer side 35 is parallel with the third inner side 35A. The triangle shape of the outer cross-section of the light-pervious hollow tube 30 includes a first outer angle 30A collimated to the invisible region 55. The third outer side 35 of the light-pervious hollow tube 30 is positioned approximate the bottom surface of the protective glass 10.

The backlight module 7 provides an incident light D. The incident light D is transmitted through the first LCD panel 51 and the second LCD panel 53, and is then propagated toward the protective glass 10, the first outer side 31 and the second outer side 33 along a first direction D1. When the incident light reaches the first outer side 31, because of the difference between the refractive index of the medium outside the light-pervious hollow tube 30 (typically air) and the refractive index of the material of the light-pervious hollow tube 30, in accordance with the Snell's refraction law, the incident light is caused with a first time refraction at the first outer side 31, and the incident light is changed from the first direction D1 to a second direction D2 for further transmitting.

When the incident light along the second direction D2 is transmitted to the first inner side 31A, because of the difference between the refractive index of the medium filled in the inner vacant space and the refractive index of the material of the light-pervious hollow tube 30, the incident light is caused with a second time refraction at the first inner side 31A, and the incident light is changed from the second direction D2 to a third direction D3 for further transmitting. After being twice refracted, the incident light transmitted along the third direction D3, and the third direction D3 is perpendicular with the third inner side 35A and the protective glass 10. In such a way, the incident light can be perpendicularly transmitted through the third inner side 35A and the third outer side 35, as well the protective glass 10. In this embodiment, it should be noted that the included angle between the first direction D1 and the first outer side 31, and the refractive index of the material of the light-pervious hollow tube 30 should be adaptively fine tuned, so as to guarantee that the third direction D3 is perpendicular with the protective glass 10 and the incident light is perpendicularly transmitted to the image-presenting region S of the protective glass 10.

Similarly, when the incident light is transmitted along the first direction D1 to the second outer side 33, because of the difference between the refractive index of the medium outside the light-pervious hollow tube 30 (typically air) and the refractive index of the material of the light-pervious hollow tube 30, in accordance with the Snell's refraction law, the incident light is caused with a first time refraction at the second outer side 33, and the incident light is changed from the first direction D1 to a second direction D4 for further transmitting. When the incident light is transmitted along the second direction D4 to the second inner side 33A, because of the difference between the refractive index of the medium filled in the inner vacant space of the light-pervious hollow tube 30 and the refractive index of the material of the light-pervious hollow tube 30, the incident light is caused with a second time refraction at the second inner side 33A, and the incident light is changed from the second direction D4 to a third direction D5 for further transmitting. The subsequent transmission of the incident light is similar to what is discussed above, and can be learnt by referring to the foregoing discussion, and is not to be iterated hereby.

According to the first embodiment of the present invention, the refractive index of the light-pervious hollow tube 30 is adaptively selected so as to control the incident light incident thereto to be twice refracted by the outer wall and inner wall of the light-pervious hollow tube respectively. The twice refracted incident light is then transmitted along a third direction D5 to the image-presenting region S of the protective glass. In such a way, the viewer won't visually feel the existence of the invisible region.

Figure 3:
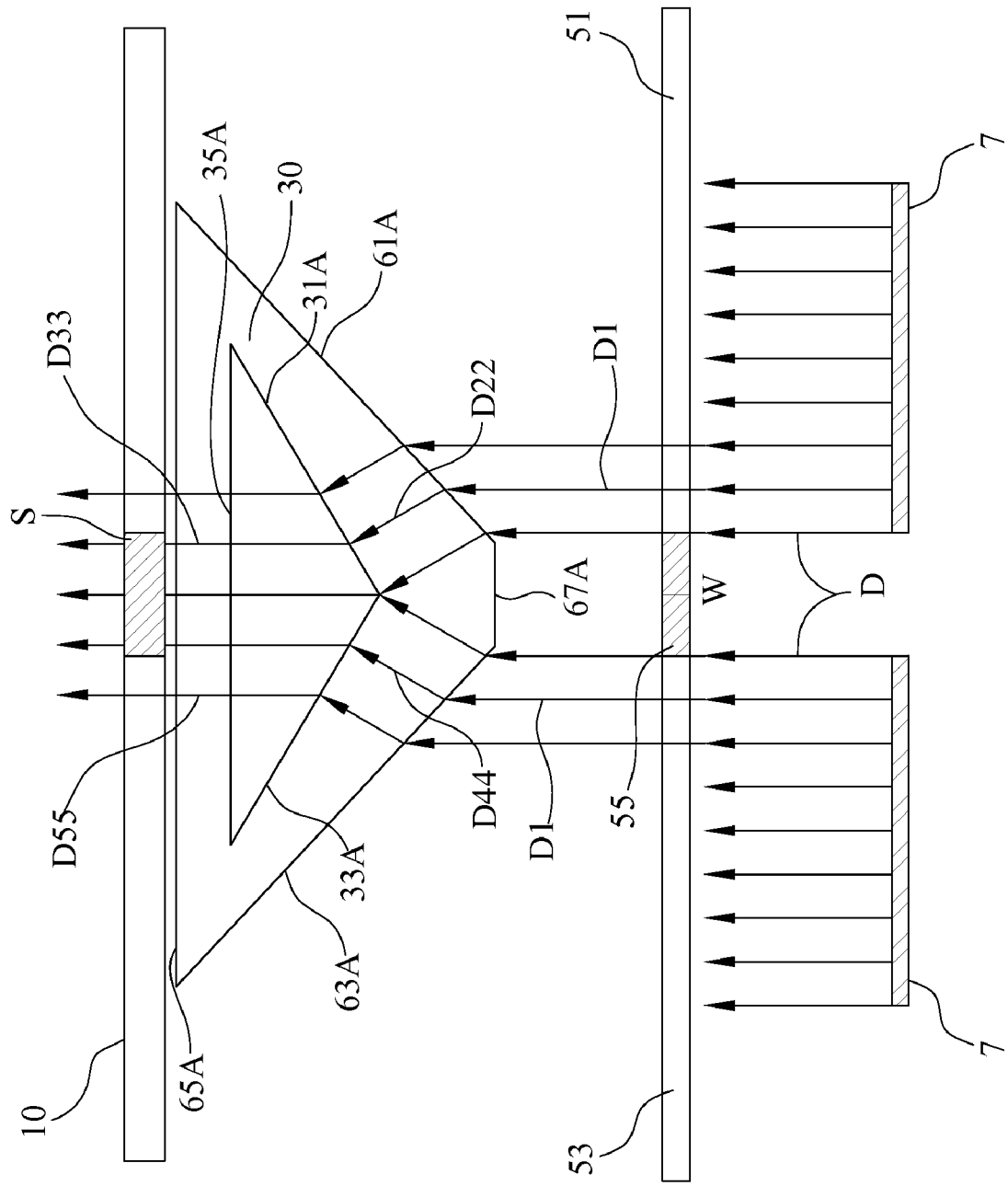
FIG. 3 illustrates the structure of a seamless display apparatus according to a second embodiment of the present invention.

FIG. 3 illustrates the structure of the seamless display apparatus according to a second embodiment of the present invention. Referring to FIG. 3, there is shown a structure of the display apparatus. The structure includes a protective glass 10, a light-pervious hollow tube 30, a first LCD panel 51, a second LCD panel 53, and a backlight module 7. As shown in FIG. 3, the first LCD panel 51 and the second LCD panel 53 are positioned over the backlight module 7. There exists an invisible region 55 between the first LCD panel 51 and the second LCD panel 53. The invisible region 55 has a width W. The protective glass 10 includes an image-presenting region S projectively corresponding to the invisible region 55.

The light-pervious hollow tube 30 is disposed over the first LCD panel 51 and the second LCD panel 53. The light-pervious hollow tube 30 is hollow inside which defines an inner vacant space inside the light-pervious hollow tube 30. The protective glass 10 is positioned over the light-pervious hollow tube 30. An outer cross-section of the light-pervious hollow tube 30 for example is trapezoid shaped and has a first outer side 61A, a second outer side 63A, a third outer side 65A, and a fourth outer side 67A. An inner cross-section of the light-pervious hollow tube 30 is triangle shaped and has a first inner side 31A, a second inner side 33A, and a third inner side 35A. The first outer side 61A is unparallel or parallel with the first inner side 31A, the second outer side 63A is unparallel or parallel with the second inner side 33A, and the third outer side 65A is parallel with the third inner side 35A. The fourth outer side 67A is parallel with the third outer side 65A and the third inner side 35A, and is proximate to and projectively corresponding to the invisible region 55. The third outer side 65A of the light-pervious hollow tube 30 is positioned approximate the bottom surface of the protective glass 10.

The backlight module 7 provides an incident light D. The incident light D is transmitted through the first LCD panel 51 and the second LCD panel 53, and is then propagated along a first direction D1 toward the protective glass 10, the first outer side 61A and the second outer side 63A. When the incident light reaches the first outer side 61A, because of the difference between the refractive index of the medium outside the light-pervious hollow tube 30 (typically air) and the refractive index of the material of the light-pervious hollow tube 30, in accordance with the Snell's refraction law, the incident light is caused with a first time refraction at the first outer side 61A, and the incident light is changed from the first direction D1 to a second direction D22 for further transmitting.

When the incident light along the second direction D22 is transmitted to the first inner side 31A, because of the difference between the refractive index of the medium filled in the inner vacant space of the light-pervious hollow tube 30 and the refractive index of the material of the light-pervious hollow tube 30, the incident light is caused with a second time refraction at the first inner side 31A, and the incident light is changed from the second direction D22 to a third direction D33 for further transmitting. After being twice refracted, the incident light transmitted along the third direction D33, and the third direction D3 is maintained perpendicular with the third inner side 35A and the protective glass 10. In such a way, the incident light can be perpendicularly transmitted through the third inner side 35A and the third outer side 35, as well the protective glass 10. In this embodiment, it should be noted that the included angle between the first direction D1 and the first outer side 61A, and the refractive index of the material of the light-pervious hollow tube 30 should be adaptively fine tuned, so as to guarantee that the third direction D33 is perpendicular with the protective glass 10 and the incident light is perpendicularly transmitted to the image-presenting region S of the protective glass 10.

Similarly, when the incident light is transmitted along the first direction D1 to the second outer side 63A, because of the difference between the refractive index of the medium outside the light-pervious hollow tube 30 (typically air) and the refractive index of the material of the light-pervious hollow tube 30, in accordance with the Snell's refraction law, the incident light is caused with a first time refraction at the second outer side 63A, and the incident light is changed from the first direction D1 to a second direction D44 for further transmitting. When the incident light is transmitted along the second direction D44 to the second inner side 33A, because of the difference between the refractive index of the medium filled in the inner vacant space and the refractive index of the material of the light-pervious hollow tube 30, the incident light is caused with a second time refraction at the second inner side 33A, and the incident light is changed from the second direction D44 to a third direction D55 for further transmitting. The subsequent transmission of the incident light is similar to what is discussed above, and can be learnt by referring to the foregoing discussion, and is not to be iterated hereby.

According to the second embodiment of the present invention, the refractive index of the light-pervious hollow tube 30 is adaptively selected so as to control the incident light D1 incident thereto to be twice refracted by the outer wall and inner wall of the light-pervious hollow tube respectively. The twice refracted incident light is then transmitted along a third direction D55 to the image-presenting region S of the protective glass. In such a way, the viewer won't visually feel the existence of the invisible region.

FIG. 2 illustrates the structure of the seamless display apparatus according to a first embodiment and a third embodiment of the present invention. Referring to FIG. 2, the present invention further provides a method for fabricating a seamless display apparatus having a plurality of panels. At first, a backlight module is prepared at a bottommost layer. Then, a plurality of LCD panels are disposed over the backlight module, in which there is an invisible region between each pair of adjacent LCD panels. Then, a plurality of light-pervious hollow tubes are disposed over the liquid crystal display panels corresponding to the invisible regions. Each of the light-pervious hollow tubes includes an inner vacant space. The inner vacant space is filled up with a filling medium. The filling medium has a specific refractive index which may be different from the refractive index of the material of the light-pervious hollow tube. Then, a protective glass is disposed over the light-pervious hollow tubes. In operation, incident light emitted from the backlight source is twice refracted by the outer walls and inner walls of the light-pervious hollow tubes, so as to eliminate the invisible regions from the light-outputting surface of the protective glass.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A seamless display apparatus, comprising:
   a backlight module, positioned at a bottom side of the seamless display apparatus, and adapted for emitting a light;
   a protective glass, positioned at a top side of the seamless display apparatus, the protective glass comprises an image-presenting region;
   at least a first panel and a second panel arranged side by side, the first panel and the second panel being positioned between the backlight module and the protective glass, wherein a region between the first panel and the second panel is an invisible region, wherein the image-presenting region is positioned projectively corresponding to the invisible region; and
   a light-pervious hollow tube, positioned over the invisible region between the first panel and the second panel, and under the protective glass, the light-pervious hollow tube comprising an inner vacant space, outer sidewalls, and inner sidewall, wherein the outer sidewalls and the inner sidewalls are adapted for twice refracting the light emitted from the backlight module for providing an outputting light outputted from the image-presenting region of the protective glass;

wherein the light-pervious hollow tube is longitudinally disposed along a joint section between the first panel and the second panel and has an outer cross-section and an inner cross-section, wherein the outer cross-section of the light-pervious hollow tube is trapezoid shaped and has a first outer side, a second outer side, a third outer side which is a long side, and a fourth outer side which is a short side, and the inner cross-section of the light-pervious hollow tube is triangle shaped and has a first inner side, a second inner side, and a third inner side, and a first inner angle, wherein the first inner angle is defined as an included angle between the first inner side and the second inner side, wherein the third outer side is adjacent to a bottom of the protective glass, and the third outer side is parallel with the third inner side and the protective glass, and the fourth outer side and the first inner angle are collimated toward the invisible region between the first panel and the second panel.

2. The seamless display apparatus according to claim 1, wherein the light-pervious hollow tube is made of glass or light-pervious plastic.

3. The seamless display apparatus according to claim 1, wherein the first outer side is parallel with the first inner side, the second outer side is parallel with the second inner side, wherein the incident light emitted from the backlight module is transmitted through the first panel and the second panel, and is then transmitted to the first outer side and the second outer side, and is twice refracted by the first outer side and the first inner side or twice refracted by the second outer side and the second inner side, respectively, and is then perpendicularly transmitted to the image-presenting region of the protective glass in accordance with the Snell's refraction law.

4. The seamless display apparatus according to claim 1, wherein the first outer side is unparallel with the first inner side, the second outer side is unparallel with the second inner side, the inner vacant space of the light-pervious hollow tube is filled up with a filling medium having a refractive index which is different from the refractive index of air, and the refractive index of the material of light-pervious hollow tube, wherein the incident light emitted from the backlight module is transmitted through the first panel and the second panel, and is then transmitted to the first outer side and the second outer side, and is twice refracted by the first outer side and the first inner side or twice refracted by the second outer side and the second inner side, respectively, and is then perpendicularly transmitted to the image-presenting region of the protective glass in accordance with the Snell's refraction law.

5. A method for fabricating a seamless display having a plurality of panels jointly arranged side by side, the method comprising:
preparing a backlight module at a bottom side of the seamless display;
providing a protective glass at a top side of the seamless display, wherein the protective glass comprises at least one image-presenting region;
arranging the panels side by side between the backlight module and the protective glass, wherein the panels comprise at least a first panel and a second panel, and there is an invisible region between the first panel and the second panel, and wherein the image-presenting region is positioned projectively corresponding to the invisible region;
securing at least one light-pervious hollow tube under the protective glass and over the invisible region between the first panel and the second panel, wherein the light-pervious hollow tube comprises an inner vacant space; and
filling a filling medium into the inner vacant space, wherein the filling medium has a refractive index different from a refractive index of the material of light-pervious hollow tube, thus allowing an incident light emitted from the backlight module to be perpendicularly projected onto the image-presenting region of the protective glass;
wherein the light-pervious hollow tube is longitudinally disposed along a joint section between the first panel and the second panel and has an outer cross-section, and an inner cross-section, wherein the outer cross-section of the light-pervious hollow tube is trapezoid shaped and has a first outer side, a second outer side, a third outer side which is a long side, and a fourth outer side which is a short side, and the inner cross-section of the light-pervious hollow tube is triangle shaped and has a first inner side, a second inner side, and a third inner side, and a first inner angle, wherein the first inner angle is defined as an included angle between the first inner side and the second inner side, wherein the third outer side is adjacent to a bottom of the protective glass, and the third outer side is parallel with the third inner side and the protective glass, and the fourth outer side and the first inner angle are collimated toward the invisible region between the first panel and the second panel.

6. The method according to claim 5, wherein the light-pervious hollow tube is made of glass or transparent plastic.

7. The method according to claim 5, wherein the refractive index of the filling medium is different from a refractive index of air, and wherein the first outer side is unparallel with the first inner side, the second outer side is unparallel with the second inner side, wherein the incident light emitted from the backlight module is transmitted through the first panel and the second panel, and is then transmitted to the first outer side and the second outer side, and is twice refracted by the first outer side and the first inner side or twice refracted by the second outer side and the second inner side, respectively, and is then perpendicularly transmitted to the image-presenting region of the protective glass in accordance with the Snell's refraction law.

8. A method for fabricating a seamless display having a plurality of panels jointly arranged side by side, the method comprising:
preparing a backlight module at a bottom side of the seamless display;
providing a protective glass at a top side of the seamless display, wherein the protective glass comprises at least one image-presenting region;
arranging the panels side by side between the backlight module and the protective glass, wherein the panels comprise at least a first panel and a second panel, and there is an invisible region between the first panel and the second panel, and wherein the image-presenting region is positioned projectively corresponding to the invisible region; and
securing at least one light-pervious hollow tube under the protective glass and over the invisible region between the first panel and the second panel, wherein the light-pervious hollow tube comprises an inner vacant space for allowing an incident light emitted from the backlight module to be twice refracted and then perpendicularly projected onto the image-presenting region of the protective glass;
wherein the light-pervious hollow tube is longitudinally disposed along a joint section between the first panel and the second panel and has an outer cross-section, and an inner cross-section, wherein the outer cross-section of the light-pervious hollow tube is trapezoid shaped and has a first outer side, a second outer side, a third outer side which is a long side, and a fourth outer side which is a short side, and the inner cross-section of the light-pervious hollow tube is triangle shaped and has a first inner side, a second inner side, and a third inner side, and a first inner angle, wherein the first inner angle is defined as an included angle between the first inner side and the second inner side, wherein the third outer side is adjacent to a bottom of the protective glass, and the third outer side is parallel with the third inner side and the protective glass, and the fourth outer side and the first inner angle are collimated toward the invisible region between the first panel and the second panel.

9. The method according to claim 8, wherein the light-pervious hollow tube is made of glass or transparent plastic.

10. The method according to claim 8, wherein the first outer side is parallel or unparallel with the first inner side, the second outer side is parallel or unparallel with the second inner side, wherein the incident light emitted from the back-light module is transmitted through the first panel and the second panel, and is then transmitted to the first outer side and the second outer side, and is twice refracted by the first outer side and the first inner side or twice refracted by the second outer side and the second inner side, respectively, and is then perpendicularly transmitted to the image-presenting region of the protective glass in accordance with the Snell's refraction law.

* * * * *